US006554729B2

(12) United States Patent
Gleasman et al.

(10) Patent No.: US 6,554,729 B2
(45) Date of Patent: Apr. 29, 2003

(54) STEER-DRIVE FOR BOATS AND PLANES

(75) Inventors: Vernon E. Gleasman, Pittsford, NY (US); Keith E. Gleasman, Fairport, NY (US); Warren R. Alexander, Pittsford, NY (US); Robert C. Horton, Canandaigua, NY (US)

(73) Assignee: Torvec, Inc., Pittsford, NY (US)

( * ) Notice: Subject to any disclaimer, the term of this patent is extended or adjusted under 35 U.S.C. 154(b) by 0 days.

(21) Appl. No.: 10/010,117

(22) Filed: Dec. 6, 2001

(65) Prior Publication Data

US 2002/0107102 A1 Aug. 8, 2002

Related U.S. Application Data

(62) Division of application No. 09/733,136, filed on Dec. 8, 2000, now Pat. No. 6,342,021.

(51) Int. Cl.$^7$ ................................................ B62D 11/06
(52) U.S. Cl. ............................ 475/18; 475/28; 440/75; 244/60
(58) Field of Search ............................. 475/18, 27, 28; 440/75, 86; 244/60, 231

(56) References Cited

U.S. PATENT DOCUMENTS

| | | | | |
|---|---|---|---|---|
| 1,984,830 A | * | 12/1934 | Higley | 475/18 |
| 2,859,641 A | | 11/1958 | Gleasman | 74/715 |
| 4,554,989 A | * | 11/1985 | Gruich et al. | 180/65.4 |
| 4,732,053 A | | 3/1988 | Gleasman et al. | 74/665 |
| 4,776,235 A | | 10/1988 | Gleasman et al. | 74/720.5 |
| 4,895,052 A | | 1/1990 | Gleasman et al. | 74/720.5 |
| 5,186,692 A | | 2/1993 | Gleasman et al. | 475/82 |
| 5,390,751 A | * | 2/1995 | Puetz et al. | 180/6.48 |
| 5,413,512 A | * | 5/1995 | Bedenger | 440/74 |
| 5,649,844 A | * | 7/1997 | Caricof et al. | 440/75 |
| 6,066,012 A | * | 5/2000 | Nagle | 440/75 |
| 6,227,481 B1 | * | 5/2001 | Fenny et al. | 244/7 R |

* cited by examiner

Primary Examiner—Dirk Wright
(74) Attorney, Agent, or Firm—Eugene Stephens & Associates; Morton A. Polster

(57) ABSTRACT

A steer-drive for vehicles primarily operated in fluids (e.g., boats and planes) interposes respective left and right orbital gear drives into the vehicle drivetrain between the engine/transmission or/speed-reducer and the vehicle's respective port and starboard propulsion elements. The orbital drive units comprise only an input gear and an output gear interconnected by at least one orbiting cluster gear that is supported in a rotating housing and also meshes only with the input and output gears. The orbital units are designed so that (a) when rotation of the housing is prevented, driving torque is transferred at speed ratios selected to be as close to 1:1 as is practical, and (b) when steering torque causes rotation of the housing, the steering torque is added or subtracted from the driving torque. Steering torque is applied simultaneously in equal and opposite directions to the orbital units, causing the vehicle's respective propulsion element on one side of the vehicle to speed up and the vehicle's respective propulsion element on the other side of the vehicle to slow down at the same rate.

10 Claims, 4 Drawing Sheets

STEER-DRIVE FOR BOATS AND PLANES

RELATED APPLICATIONS

This application is a Division of allowed parent application Ser. No. 09/733,136, filed Dec. 8, 2000, now U.S. Pat. No. B1 6,342,021 by Vernon E. Gleasman, Keith E. Gleasman, Warren R. Alexander, and Robert C. Horton, entitled STEER-DRIVE FOR VEHICLES.

TECHNICAL FIELD

This invention relates to a simplified steering system for vehicles that operate primarily in fluids (e.g., boats and airplanes) and, more particularly, to a simplified steering system that permits the vehicle (i.e., boat or plane) to be steered at all times by a conventional steering actuator without necessitating the use of steered wheels or rudders.

BACKGROUND

Our earlier inventions (e.g., U.S. Pat. No. 4,776,235 to V. E. Gleasman et al.) make it possible to steer track-laying vehicles with a single steering wheel in the same manner as other highway vehicles are steered. In these earlier steer-drives, a pair of standard differentials or a pair of standard reduction gear drives (e.g., also see U.S. Pat. No. 4,895,052 to V. E. Gleasman et al.) are interconnected as part of a hydro- (or electro-) mechanical system that is inserted in the vehicle's drivetrain between the vehicle's transmission and track propulsion shafts. These steer-drives add and subtract steering torque to and from driving torque that is supplied to each of the respective tracks of the vehicle, thereby permitting the vehicle to be steered with a conventional steering wheel without requiring any simultaneous locking or braking of either one of the tracks.

While the prior art systems just identified above operate satisfactorily, they are relatively large and mechanically complex. Since these steer-drive systems do not replace the conventional engines and transmissions necessary for automotive vehicles, they require additional space and add weight. Therefore, it is commercially desirable to achieve reductions in the size and weight of steer-drives. Such size and weight reductions are primarily limited by the size and strength of the materials required to transfer the vehicle's driving torque from its engine and transmission through to the vehicle's propulsion elements.

The maximum torque being transmitted by the various elements positioned throughout the vehicle's drivetrain is determined by the output of the engine and by any increases in the mechanical advantage of that engine output by virtue of the various gear ratio speed reductions realized throughout the drivetrain. For instance, if the drivetrain includes a mechanical speed-reduction unit that reduces the speed of a given rotational input shaft by a ratio of 2:1, this results in a mechanical advantage that effectively doubles the torque being transmitted, thus requiring a doubling of the strength of the speed-reduction unit's elements compared to other similar drivetrain elements that normally rotate at higher speeds.

In this regard, standard planetary gear drives (e.g., those shown in several different arrangements in the prior art patents referred to above) provide a limited range of speed-reduced outputs. [NOTE: "Standard planetary drives" consist of a sun gear, an exterior ring gear, and planet gears in mesh with both the sun gear and the ring gear, the planet gears being supported by the arms of a carrier. Such planetary drives can be used in many different ways to provide a variety of positive and negative speed reductions, namely, the input can rotate any one of the components (the sun gear, the ring gear, or the carrier), while output can be taken from either of the other components. However, for practical use in combining steering and driving torque, input is received through the sun gear.] According to automotive textbooks, with input to the sun gear, standard planetary gear drives are all limited in actual practice to producing speed-reduced outputs that range between 2.5:1–5:1. That is, the elements of such planetary gear drives must be made large enough to support the 2.5- to 5-times increase in torque that results from their built-in gear reduction. Therefore, these prior art planetary drives must include elements that are stronger (larger and heavier) than would be needed for components providing lesser speed reductions.

The subject invention was conceived during the testing of a new prototype steer-drive vehicle when trying to develop a further variation of our earlier steer-drive systems that would be lighter and more compact. While the invention uses the same basic steer-drive concepts for combining steering and driving torque, it replaces key elements of prior art steer-drives with a known and relatively simple gear arrangement that, in this new combination, results in a new steer-drive that is not only more compact and lighter in weight but, surprisingly, is also simpler mechanically and reduced in cost. Further, this simpler, lighter, and more compact steer-drive is applicable as well to non-automotive vehicles that operate primarily in fluids, namely, boats and airplanes.

SUMMARY OF THE INVENTION

In its primary application, this steer-drive is designed for use on tracked vehicles which not only operate off-road but are specifically intended to be driven on paved roads at typical highway speeds. As is well known in the automotive world, most standard vehicles driven at highway speeds normally rotate the axles which directly drive the vehicle's tires at an overall speed reduction ratio of about 4–5:1 relative to the vehicle's engine. One of the key objects of the invention is to realize most of this normal overall speed reduction as close as is practical to the drive axles that directly drive the vehicle's tracks or propellers. That is, the steer-drive of the invention is intentionally and preferably designed to provide a speed ratio (between the input to the steer-drive, i.e., the output of the vehicle's transmission, and the output of the steer-drive itself) that is as close to 1:1 as is practical without actually matching 1:1.

Prior art steer-drives use pairs of standard differentials or pairs of standard reduction gear drives, the latter being located in proximity to the vehicle's drive axles. The steer-drive disclosed herein uses neither a combination of standard differentials nor standard reduction gear drives. Instead, the desired combination of driving and steering torque is achieved by respective left and right orbital gear drive units. [NOTE: Orbital gear arrangements (sometimes identified as "reverted epicylic gear trains") are well known, e.g., see U.S. Pat. No. 5,186,692 entitled "Hydromechanical Orbital Transmission" issued to V. E. Gleasman et al.]

The orbital gear portions of the steer-drive units disclosed herein are quite simple in format, comprising only an input gear and an output gear interconnected by at least one orbiting cluster gear. As used in this invention, these orbital drive units are preferably designed to transfer driving torque at speed ratios selected to be as close to 1:1 as is practical and, in any event, at ratios less than can be practically achieved with the standard reduction gear drives shown in prior art steer-drives. [NOTE: When used for steer-drive purposes, orbital gear drives must operate at some ratio greater than or less than 1:1. Practical considerations determining the selection of such gear ratios will be discussed in greater detail below, and the disclosed preferred orbital drive units are designed so that, when the additions and subtractions of steering torque are ignored, driving torque is transferred through each unit at a ratio of 1:1.36.]

Each orbital unit has an input gear and an output gear aligned along the same first axis and interconnected by at least one orbiting cluster gear mounted for rotation on an orbit shaft positioned parallel with the first axis. The orbit shaft is supported in a housing that also rotates about the first axis. When rotation of the housing is prevented, the rotation of the input gear drives the cluster gear which, in turn, causes rotation of the output gear (e.g., at a speed ratio of 1.36:1). However, rotation of the housing supporting the orbit shaft causes the cluster gear to orbit about the input and output gears; and even though the speed of rotation of the input gear remains constant, such orbital movement of the cluster gear results in a variation of the speed of the output gear. Thus, rotation of the housing in one direction causes an increase in the speed of the output gear, while rotation of the housing in the opposite direction causes a decrease in the speed of the output gear.

Steering control is achieved by controlling the rotation of the housing of each orbital unit with a simple mechanical arrangement: Namely, rotation of each orbital unit housing is controlled by a steer-drive motor that is responsive to the operation of the vehicle's steering actuator, the direction and distance of steering actuator motion being translated into a respective variation in the direction and speed of the steer-drive motor. The steering torque created by the steering motor is transferred to the housings of the orbital units by respective rotary connectors, e.g., worms associated with wormgears fixed, respectively, to each of the housings. This steering torque is applied simultaneously, and in opposite directions, to the right and left orbital units; and the steering torque is superimposed over any driving torque being transferred between the input and output gears of each orbital unit. That is, in this simple manner, driving and steering torque are instantaneously combined by each orbital unit. Since this steering torque is applied simultaneously, it causes the propulsion element (e.g., track, propeller, jet) on one side of the vehicle to speed up and the propulsion element on the other side of the vehicle to slow down at the same rate; and this change of speed of the tracks (propellers, jets) relative to each other causes the vehicle to turn in the direction of the slower-moving propulsion element.

[NOTE: Since the rpm of the drive shafts determines the speed and direction of vehicle movement at any given instant, and since that rpm is determined by the loads being carried and the torque being delivered, the terms "driving torque" and "steering torque" are often used herein (and in the cited prior art) almost interchangeably with "driving rpm" and "steering rpm", each being intended to refer to the changes in motion necessary for driving and steering the vehicle under prevailing conditions.] When the vehicle engine is operating but no driving rpm is being delivered to the input gears of the two orbital units, steering rpm can still be delivered to the housings of the orbital units by the steer-drive motor. If this is done when the vehicle's brakes (if any) are not engaged, the vehicle will pivot turn about its center. That is, e.g., in the case of a tracked vehicle, the operation of the steer-drive motor will cause the tracks to move simultaneously in opposite directions at the same speed. Since both tracks are moving, this pivot turn is accomplished without dragging either track and, therefore, with minimal effect on the terrain upon which the vehicle is standing.

In the preferred tracked vehicle embodiment disclosed, each track is driven by a respective front- and rear-drive axle; and, in order to prevent undesirable "wind-up" between the front and rear of each driven track, the combined driving and steering torque transmitted by the respective output gear of each orbital steer-drive unit is connected to a respective left- and right-side torque-proportioning differential which then divides and delivers the combined driving and steering torque differentially between the front- and rear-drive axles of each track. While such known torque-proportioning differentials are used with prior art steer-drives, it should be noted that, with the invention's preferred steer-drive embodiments (designed to minimize speed reduction), the size of these known differentials may be reduced.

In addition to having fewer and less expensive parts, and in addition to providing a much simpler means for combining steering and driving torque, the orbital steer-drive units of the invention have another important advantage over the prior art: Design variations are greatly facilitated, since gear speed ratios can be selected throughout a much wider practical range (e.g., 1:1 to 13:1); and, further, throughout this extended range, the physical size of the invention's orbital drive units (e.g., measured outside diameter) is smaller than the size of a standard reduction gear drive for any particular speed ratio selected. However, in view of the invention's expressed goal to limit the size and weight of steer-drive systems when used in track-laying vehicles, selection of gear ratios equal to, or less than, 3:1 are preferred.

Thus, the components of our orbital steer-drive (as well as the components of the accompanying torque-proportioning differentials used in embodiments designed for track-laying vehicles) can be smaller, lighter, and more compact; and almost all of the speed reduction desired between the engine and each of the vehicle's propulsion elements can be realized between the output axles of the orbital drive units and the propulsion elements or, in the case of tracked vehicles, between the output axles of each torque-proportioning differential and the front- and rear-drive axles of each respective track. For instance, where the steer-drive is designed for a tracked vehicle intended for use at highway speeds, the final connection between each differential and the drive axles for each track includes a further speed reduction selected so that, when the transmission is operating at 1:1 with the vehicle's engine, there will be an overall speed reduction ratio of approximately 4–5:1.

DRAWINGS

DETAILED DESCRIPTION

Figure 1:
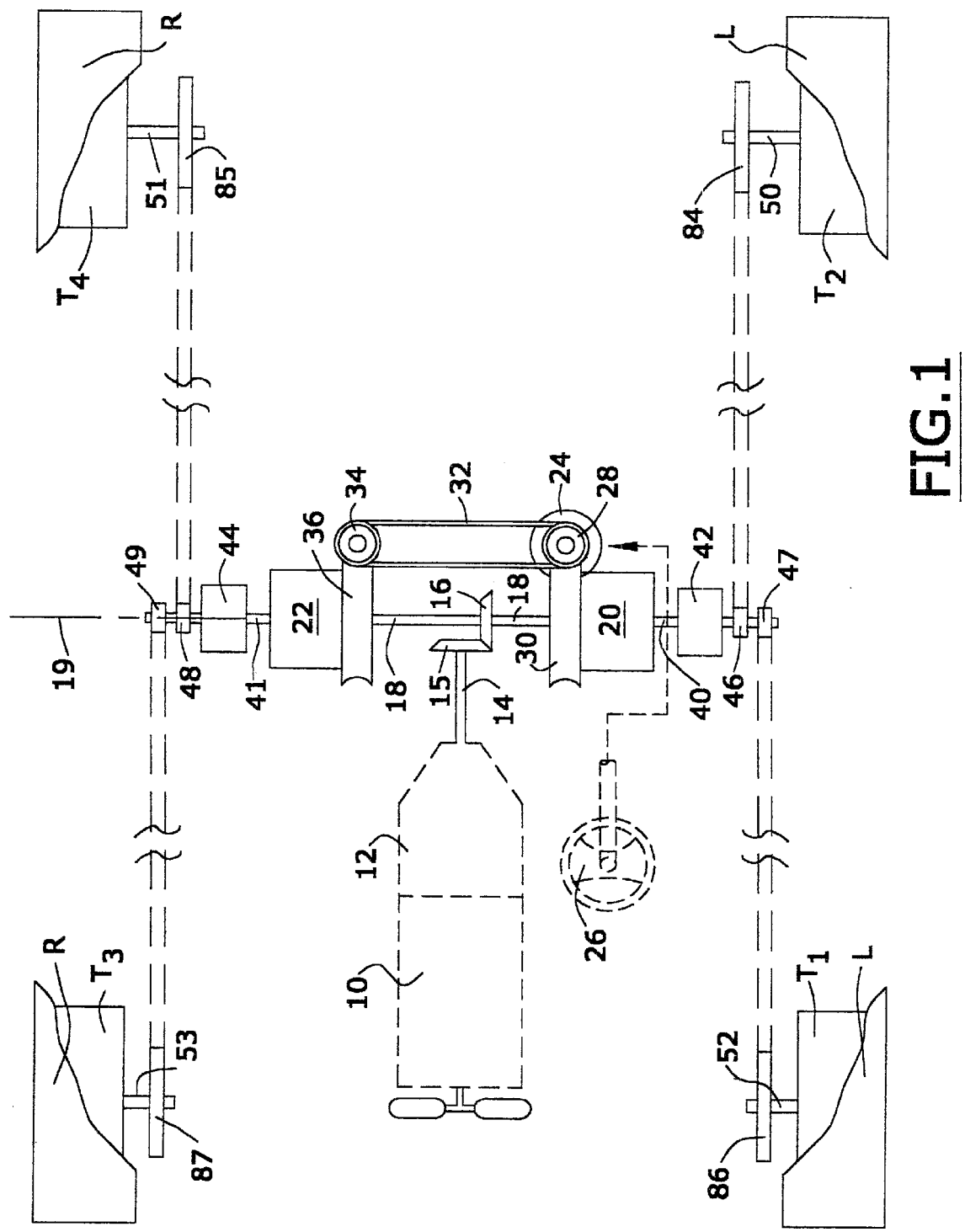
FIG. 1 is a combined block diagram and schematic representation of key steer-drive components organized with portions of a track-laying vehicle.

In the schematic and block representation shown in FIG. 1, the steer-drive invention is illustrated in combination with key elements of a track-laying vehicle that is supported on, and propelled by, a left track L and right track R. In preferred embodiments, tracks L, R are comprised primarily of rubber or other elastomeric materials; and each is driven by the steer-drive system of the invention through frictional contact with tires $T_1$, $T_2$, $T_3$, $T_4$ that are wrapped, as indicated, within the front and rear of each track.

The vehicle's engine 10 and transmission 12 deliver driving torque through a main drive shaft 14 and bevel gears 15, 16 to a central propulsion shaft 18 aligned along a central axis 19. Central propulsion shaft 18 divides driving torque input between respective left and right orbital units 20 and 22. A steering motor 24 (either hydraulic or electric) responsive to the operation of the vehicle's steering actuator 26 drives respective left and right sets of rotary connectors. Namely, steering motor 24 drives a left-side worm 28 and, thereby, delivers steering torque through left-side wormgear 30 to left orbital unit 20; and a chain drive 32 directly connects left-side worm 28 with a right-side worm 34 and, thereby, delivers steering torque from steering motor 24 through right-side wormgear 36 to right orbital unit 22. [NOTE: As will be understood by those skilled in the art (and as indicated in the prior art steer-drive patents cited above), the motive power for steering motor 26 is preferably derived from a power take-off included on engine 10.]

While left- and right-side worm/wormgear sets 28/30, 34/36 are identical in size, lead, and tooth ratios, the sets have teeth with helix angles of the opposite hand. That is, while worm 34 rotates at all times in the same direction and at the same speed as worm 28, the opposite hand of its teeth causes wormgear 36 to rotate in the opposite direction of wormgear 30.

Left and right orbital units 20, 22 have respective output shafts 40, 41 that deliver combined driving and steering torque (as will be described in greater detail below) to respective left and right differentials 42, 44. The driving and steering torque that, as indicated above, has already been divided between the respective left and right orbital units, is further divided by differentials 42, 44 between respective front and rear chain drive sprockets. Namely, rear drive sprockets 46, 48 deliver torque to rear drive axles 50, 51 and front drive sprockets 47, 49 deliver torque to front drive axles 52, 53. Thus, each track L, R is driven by a separate combination of driving and steering torque; and, in addition, wind-up between the front and rear of each track L, R is prevented by the differentiated division of that torque between the front and rear drive axles of each track.

Figure 2:
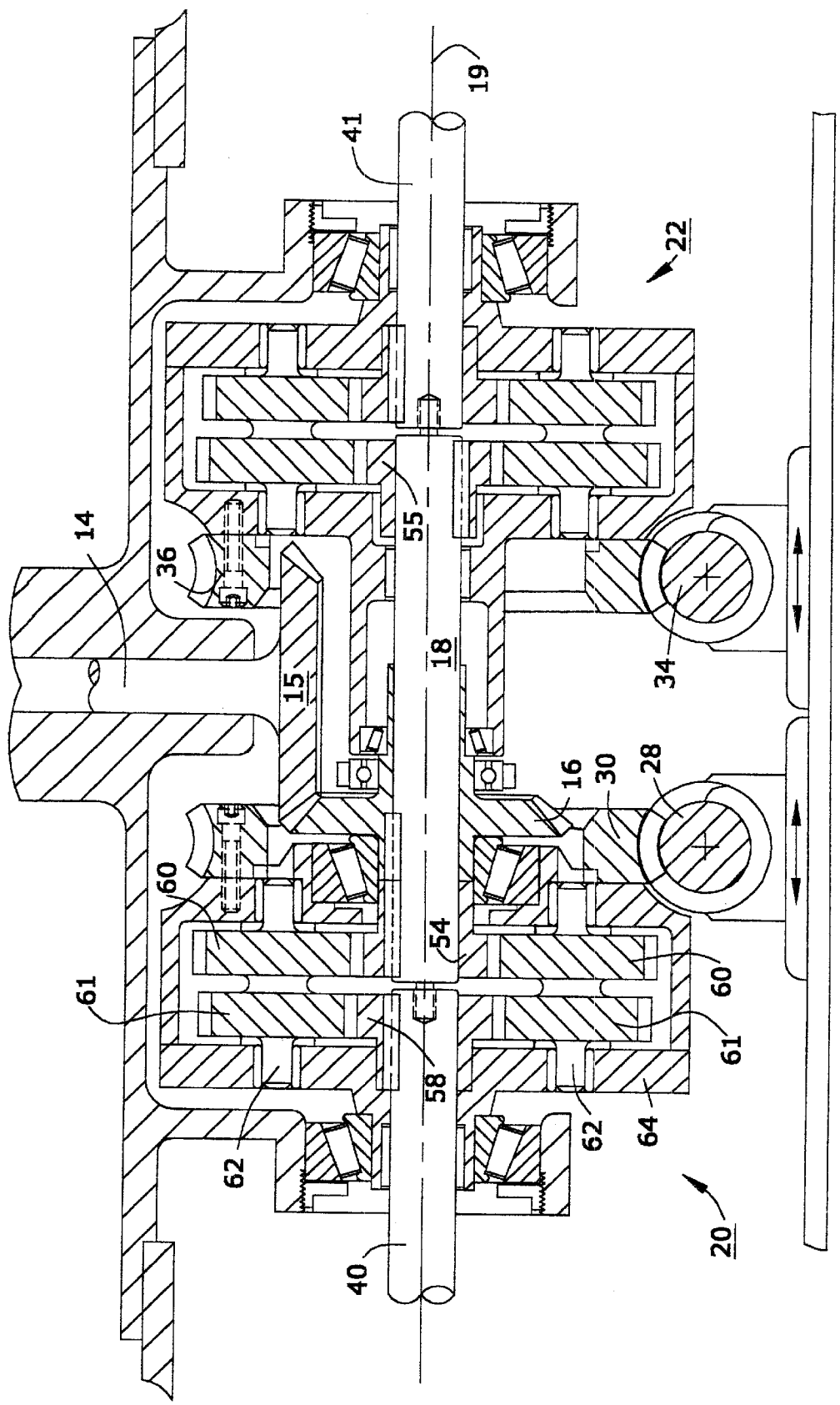
FIG. 2 is an enlarged and partially cross-sectional view of the orbiter drive units of the invention represented schematically in FIG. 1.

Left orbital unit 20 and right orbital unit 22, which are shown enlarged and in greater detail in FIG. 2, will now be described with particular emphasis being placed upon the features that permit both the simplification of steering control and the transmission of torque at higher speeds, thereby reducing the size and weight of these steer-drive units as compared to the prior art previously discussed.

As explained above, central propulsion shaft 18, which is aligned along central axis 19, is fixed to bevel gear 16 and rotates with main drive shaft 14 and bevel gear 15. Central shaft 18 is also fixed to respective input gears 54, 55 of each orbital unit 20, 22.

Since units 20 and 22 are essentially identical, only unit 20 will be described in detail.

Mounted co-axially with input gear 54 on central axis 19 is an output gear 58 fixed to left output shaft 40. Input gear 54 and output gear 58 are interconnected through the meshing teeth of two sets of cluster gears 60/61, each mounted for rotation about an orbit shaft 62 that is positioned parallel to central axis 19. (While only two sets of cluster gears are shown, those skilled in the art will appreciate that three or four sets of cluster gears may also be used.) Each orbit shaft 62 is held in position by, and moves with, a housing 64 that is also mounted for rotation about central axis 19. Thus, any movement of housing 64 results in the orbital movement of cluster gears 60/61 about the circumferences of input and output gears 54, 58.

However, when the movement of housing 64 is prevented, cluster gears 60/61 do not orbit, and the rotation of input gear 54 is transferred to output gear 58 according to the gear ratios determined by the number of teeth on the mating gear pairs, namely, input gear 54 mating with cluster gear 60 and cluster gear 61 mating with output gear 58.

As indicated above, significant reductions in size and weight can be realized throughout the vehicle drivetrain by minimizing increases in gear reduction ratios, thereby reducing the resulting increased torque loads that accompany such increases in mechanical advantage. Therefore, in preferred embodiments of the invention, a gear ratio close to 1:1 is used for bevel gears 15, 16 so that the torque load delivered to left and right orbital units 20, 22 remains only slightly greater or less than that carried by main drive 14. In the particular preferred embodiment being presently described, bevel gears 15, 16 are designed to provide a slight under-drive, namely, 1.36:1 for reasons to be explained below.

Similarly, the gear ratio within each orbital unit 20, 22 is also maintained either slightly greater or less than 1:1, but preferably as close to 1:1 as is practical given the restraints created by the needed speed and size of steering motor 24 (only shown in FIG. 1) as will be discussed below. For a preferred embodiment, the following gear tooth ratios are selected:

| Gear | No. of Teeth |
| --- | --- |
| Input gear 54 | 28 |
| Cluster gear 60 | 24 |
| Cluster gear 61 | 28 |
| Output gear 58 | 24 |

When housing 64 is prevented from rotation, this gear tooth combination delivers driving torque from central propulsion shaft 18 to each output shaft 40, 41 at a gear ratio of 1:1.36. It will be noted that this speed increase offsets the slight under-drive provided by bevel gears 15, 16 so that the output of driving torque developed by output shafts 40, 41 is delivered at speeds that match 1:1 with main drive shaft 14 (FIG. 1).

As explained above, fixed to housing 64 is a rotary connector in the form of wormgear 30 which is rotated by a respective mating worm 28 that, in turn, is driven by steering motor 24 in response to the operation of steering actuator (wheel) 26 (motor 24 and steering wheel 26 are shown only in FIG. 1). When steering wheel 26 is turned to the right of a neutral center position, steering motor 24 rotates in a first direction at a speed of rotation that varies directly with the distance (i.e., the length of the arc) through which steering wheel 26 is moved; and, when steering wheel 26 is turned to the left of the neutral center position, steering motor 24 rotates in the opposite direction, again at a speed of rotation that varies directly with the length of the arc through which steering wheel 26 is moved.

Such rotation of steering motor 24 drives worm 28 and also worm 34 through chain drive 32 (FIG. 1). Since worms 28 and 34 have helix angles of opposite hand, the rotation of steering motor 24 causes wormgears 30, 36 to rotate at the same speed but in opposite directions. Therefore, when steering wheel 26 is turned to the right, the rotation of steering motor 24 causes wormgear 30 and housing 64 of orbital unit 20 to rotate in a direction that adds speed to output gear 58 and shaft 40 and, simultaneously, causes wormgear 36 and the housing of orbital unit 22 to rotate in the opposite direction to subtract the same amount from the speed of rotation of output shaft 41. These speed changes, when delivered to tracks L, R, cause the vehicle to turn to the right.

The steering torque rotations are added or subtracted to the rotations of output shafts 40, 41 by an "orbit ratio" determined by the numbers of teeth in the gears of the orbital units. The orbit ratio determines the number of revolutions of output gear 58 in response to one orbit of housing 64 when rotation of input gear 54 is prevented (i.e., no driving torque is being delivered from main drive shaft 14). With the gearing selected in the table shown above, the orbit ratio is 2.77:1. That is, depending upon the direction in which it is driven, each rotation of housing 64 adds or subtracts 0.36 revolutions to output gear 58.

As discussed above, while it is desirable to minimize the gear speed reduction of the steer-drive toward 1:1, practical considerations determine the selection of such speed reduction. These various practical considerations are determined by compromises made among (i) the size of the steering motor required to generate the steering torque, (ii) the worm/wormgear combinations (wormgear diameter, number of worm leads, etc.) needed to assure appropriate steering control during all expected operations of the vehicle, and (iii) the various torque demands for vehicle operations.

For instance, assume that the steer-drive must be capable of pivot turning the vehicle when very high coefficients of friction are being experienced (e.g., when the vehicle is standing on concrete fully loaded and not being moved either forward or backward). While considerable steering torque is required (several times the torque required to propel the vehicle up a 60% grade), it would be possible to provide such considerable steering torque by means of a relatively small motor 24 in conjunction with a very high mechanical advantage (e.g., a very high gear reduction of 60:1 between steering motor 24 and output shaft 40) supplied through appropriate combinations of worm/wormgears 28/30, 34/36 and the orbit ratios of orbital units 20, 22.

However, at such a very high gear reduction (e.g., 60:1), the steering motor would require an exceptionally fast response time and have to be run at exceptionally high speeds in order to add and subtract the speed of rotation necessary to make appropriate steering adjustments when the vehicle is traveling at highway speeds. Also, in addition to pivot turning and high speed highway operation, other specifications desired for vehicle operations, e.g., turning circle, may also be adversely affected by selecting such very high gear ratios for steering control.

Therefore, for practical operation, gear ratio selections are made by reaching a compromise that can provide appropriate steering control for all intended vehicle functions. In the preferred steer-drive shown, in addition to the steer-drive torque ratio of 1.36:1 (between input gear 54 and output gear 58 as explained above), a speed reduction of around 15:1 between worm 28 and wormgear 30 is selected in conjunction with the above-described orbital ratio of 2.77:1 to provide an overall reduction of 41.5:1 between the output shaft of steering motor 24 and output gear 58. These selected speed-reduction ratios are combined with a hydraulic steering motor 24 that is capable of a maximum speed of approximately 2800 rpm when operated by the vehicle's light duty diesel truck engine 10 to permit pivot turns on concrete, permit fast steering response at highway speeds, and also assure commercially competitive turning circles, namely, the ability of the tracked vehicle to be pivot turned at 6 revolutions per minute and turned, during normal operation, in a radius of 10.5 meters (35 feet) when traveling at a speed of 11.2 kilometers (7 miles)/hour.

It should be understood that the just-described ratios are exemplary only and can be varied while still achieving a preferred arrangement wherein the overall ratio between the output of the transmission and the output of the orbital units remains close to 1:1. For instance, in another possible arrangement, the following gear tooth ratios are selected:

| Gear | No. of Teeth |
| --- | --- |
| Input gear 54 | 24 |
| Cluster gear 60 | 28 |
| Cluster gear 61 | 24 |
| Output gear 58 | 28 |

This combination provides the orbital unit with a slightly reduced speed ratio, namely, 1:0.74. To compensate for this decrease, bevel gears 15 and 16 can be selected to provide a slight speed increase of approximately 0.74:1 to maintain the desired overall speed ratio of close to 1:1 for the steer-drive.

As indicated above, torque-proportioning differentials are used with preferred embodiments of the invention for tracklaying vehicles to prevent track "wind-up". While many different types of known torque-proportioning differentials can be used with the invention, the following disclosure shows and perfunctorily describes the invention incorporating a well-known type of all-gear, "crossed-axis", torque-proportioning differential (e.g., the Torsen® differential units used in the center-box of 4-wheel drive vehicles). [A crossed-axis differential design is shown and described in detail in U.S. Pat. No. 2,859,641 (Gleasman).]

Figure 3:
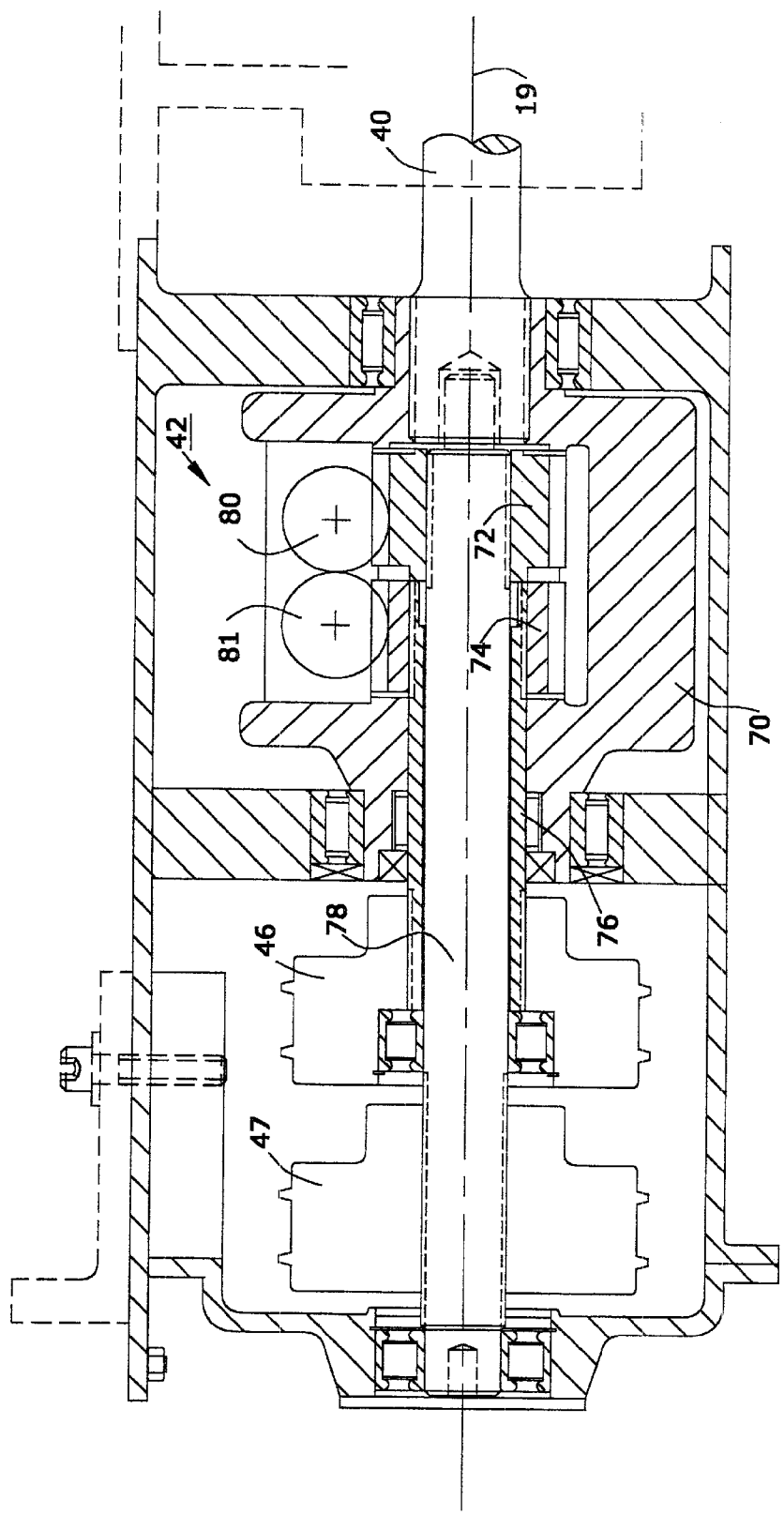
FIG. 3 is an enlarged schematic and partially cross-sectional view of one of the differentials of the invention represented in block form in FIG. 1, including the drive sprockets connected to the two outputs of the differential.

Reference is now made to the enlarged view of left differential 42 shown in FIG. 3. As indicated in the discussion above relating to FIG. 1, the driving and steering torque combined in left orbital unit 20 is delivered via left output shaft 40 to left differential 42. [NOTE: The following description, which is limited to differential 42 and chain drive sprockets 46, 47, relates equally to right differential 44 and right chain drive sprockets 48, 49, since the latter have mirror-image similarity to the former.]

Differential 42 is, preferably, an all-gear, torque-proportioning differential of the known type just identified above. Differential 42 has a housing 70 that is keyed to, and rotates with, output shaft 40 about central axis 19. Also mounted for rotation about central axis 19 are two side gears 72, 74 that are connected, respectively, to a hollow axle 76 and a solid axle 78.

While only shown schematically in FIG. 3, differential 42 comprises a well-known compound planetary gear arrangement in which axles 76, 78 are supported for opposite relative rotation (i.e., differentiation) to permit the axles to be driven at different speeds. Side gears 72, 74, acting as sun gears, are interconnected by a pair of combination gears 80, 81 that are carried by housing 70 for orbiting rotation about central axis 19. Combination gears 80, 81 are arranged in sets of meshing pairs (only one shown), being spaced circumferentially and equidistant about central axis 19. Each combination gear 80, 81 has a respective wormgear middle portion that meshes with the helical-worm teeth of one of the side gears 72, 74, while the combination gears of each set mesh with each other through spur gear teeth (not shown) formed at their outer ends.

Hollow axle 76 is keyed to left rear chain sprocket 46 which drives the rear of track L through drive axle 50 and tire $T_2$ (see FIG. 1), while solid axle 78 is keyed to left front chain sprocket 47 to drive the front of track L through drive axle 52 and tire $T_1$. Undesirable "wind-up" between the front and rear of track L is minimized by differential 42 which proportions the torque distributed between axles 76, 78 to assure that more torque goes to the slower moving axle.

As indicated earlier, when used for tracked vehicles designed for high-speed travel over paved highways as well as for off-road terrain, an overall gear reduction of 4–5:1 is desirable between the engine and the tracks when the vehicle's transmission output (main drive shaft 14) is set for its highest speeds. Therefore, (referring again to FIG. 1) since highest speed transmission ratios often use a slight over-drive (i.e., less than 1:1), and since the steer-drive just described above does not add any further reduction, it is necessary to provide a further speed reduction between output shafts 40, 41 and tracks L, R. This is accomplished by increasing the diameter of chain drive sprockets 84, 85, 86, and 87 relative to sprockets 50, 51, 52, and 53. In the preferred arrangement shown, this suggested further speed reduction is about 4.6:1.

Again, attention is called to the fact that the relatively small speed reduction throughout the steer-drive components of the invention (e.g., 1.36:1±the steering torque) makes possible significant reductions in size and weight, permitting the steer-drive components to be more compact and more easily integrated into existing drivetrains. Further, the steer-drive of the invention makes it simpler to combine steering and driving torque, provides greater ranges for speed-reduction ratio designs, and is easier to assemble and less expensive to manufacture. These just-listed advantages of the invention also make this novel steer-drive appropriate for use in vehicles that travel primarily in fluids, e.g., boats and airplanes.

Figure 4:
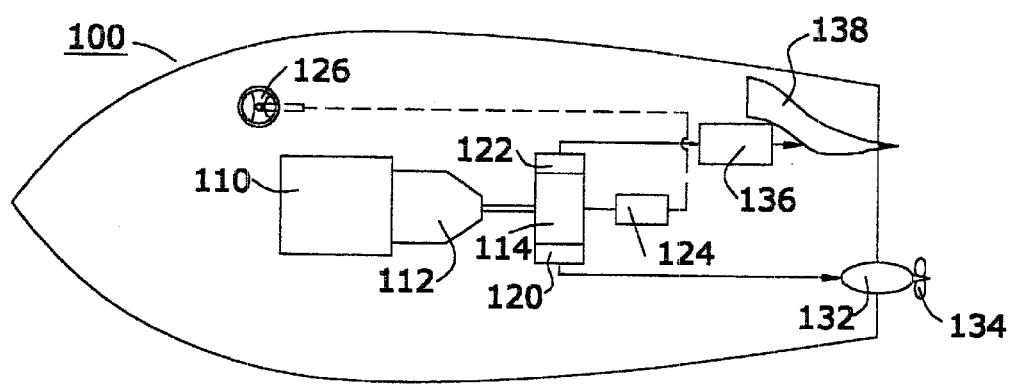
FIG. 4 is a combined block diagram and schematic representation of key steer-drive components arranged with the drive units of a boat, the left (port) side propulsion element being represented schematically as a propeller, while the right (starboard) side propulsion element is represented schematically as a fluid jet emission device.

Referring to the schematic diagram of FIG. 4, a boat 100 is equipped with an engine 110 and transmission 112 which provide driving rpm to steer-drive apparatus 114 including respective left and right orbital units 120, 122. Steer-drive apparatus 114 is substantially identical to the steer-drive apparatus described in detail above with reference to FIGS. 1 and 2. Namely, in addition to the just-identified driving rpm, steer-drive apparatus 114 also receives steering rpm from a steering motor 124, the direction and speed of this steering rpm being generated by steering motor 124 in direct response to the direction and distance of motion applied to the boat's steering actuator 126 by the boat's operator.

As described above, the output of orbital units 120, 122 is a combination of the driving rpm delivered to steer-drive apparatus 114, plus and minus, respectively, the just-identified steering rpm. The output of orbital units 120, 122 is delivered, respectively, to port (left-side) drive unit 132 and starboard (right-side) drive unit 136, which, respectively, operate respective port and starboard propulsion elements 134, 138.

In this very schematic representation, port propulsion element 134 is shown as a propeller, while starboard propulsion element 138 is shown as a fluid jet emission device. [NOTE: Of course, it is to be understood that, in actual practice, the port and starboard propulsion elements will either both be propellers or both be fluid jet emission devices and that the depiction of both elements on boat 100 is solely for the purpose of clarifying that the invention's steer-drive in this embodiment can be used in combination with either type of propulsion element.]

When boat 100 is in operation and under way in response to driving torque being delivered to steer-drive 114 by transmission 112, the turning of steering actuator 126 will result in the generation of steering torque that will be added to and subtracted from, respectively, the driving torque being delivered to port and starboard propulsion elements 134, 138; and as a result, as boat 100 proceeds through the water, it will turn in the direction of the rotation of steering actuator 126, the angle and sharpness of the turn being directly responsive to the speed and angular distance through which actuator 126 has been moved. This turning of boat 100 can be achieved with or without the assistance of a conventional rudder.

Also, it is important to note that the just-described simultaneous variation in the direction or motive force of propulsion units 134, 138 relative to each other is achieved even though boat 100 has only a single engine 110.

Figure 5:
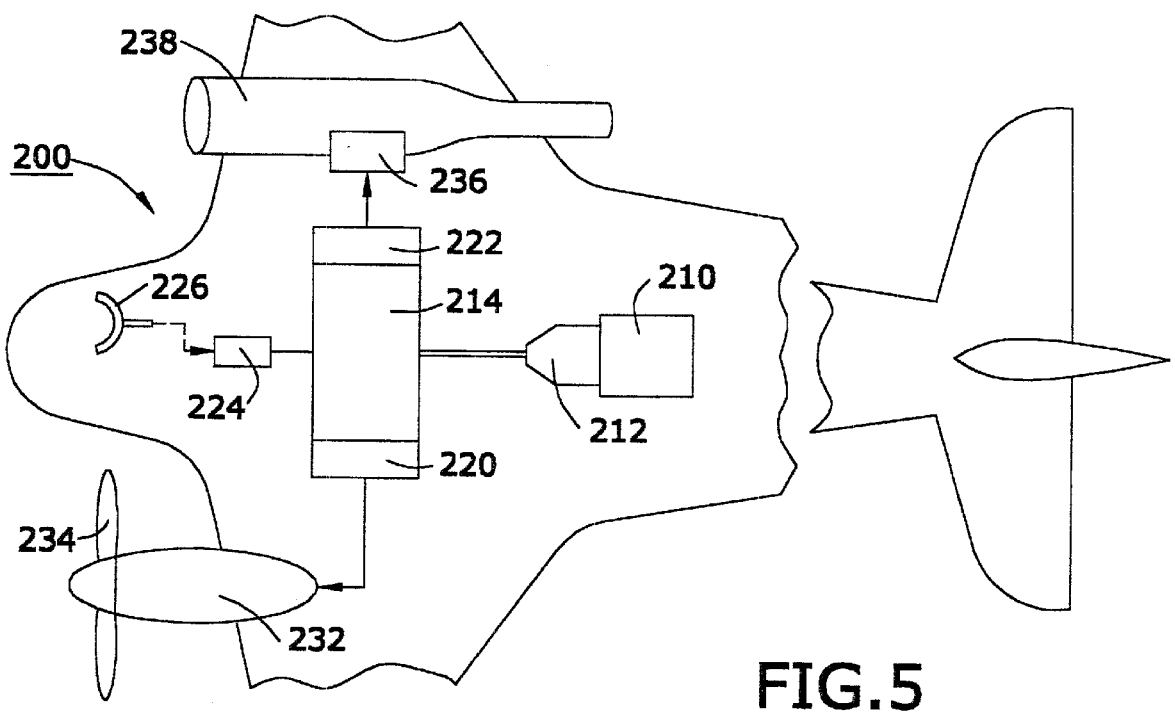
FIG. 5 is a combined block diagram and schematic representation of key steer-drive components organized with portions of an airplane, the left (port) and right (starboard) propulsion elements being represented schematically as propellers.

Referring next to the schematic diagram of FIG. 5, an airplane 200 is equipped with an engine 210 and speed-reducer 212 which provide driving torque to steer-drive apparatus 214 including respective left and right orbital units 220, 222. Steer-drive apparatus 214 is substantially identical to the steer-drive apparatus described in detail above with reference to FIGS. 1, 2, and 4. Namely, in addition to the just-identified driving torque, steer-drive apparatus 214 also receives steering torque from a steering motor 224, the direction and speed of this steering torque being generated by steering motor 224 in direct response to the direction and distance of motion applied to the airplane's steering actuator 226 by the plane's operator.

As described above, the output of orbital units 220, 222 is a combination of the driving torque delivered to steer-drive apparatus 214, plus and minus, respectively, the just-identified steering torque. The output of orbital units 220, 222 is delivered, respectively, to port (left-side) drive unit 232 and starboard (right-side) drive unit 236, which, respectively, operate respective port and starboard propellers 234, 238.

When airplane 200 is in operation and airborne in response to driving torque being delivered to steer-drive 214, the turning of steering actuator 226 will result in the generation of steering torque that will be added to and subtracted from, respectively, the driving torque being delivered to port and starboard propellers 234, 238; and as a result, as plane 200 proceeds through the air, it will turn in the direction of the rotation of steering actuator 126, the angle and sharpness of the turn being directly responsive to the speed and angular distance through which actuator 226 has been moved. This turning of plane 200 can be achieved with or without the assistance of a conventional rudder. However, persons skilled in the operation of aircraft will appreciate that proper control will also require the use of the plane's ailerons.

Again, it is important to note that the just-described simultaneous variation in the direction or motive force of propellers 234, 238 relative to each other is achieved even though airplane 200 has only a single engine 210.

It is extremely difficult to alter the position of conventionally driven boats and planes when they are not, respectively, under way or airborne; and another important feature of the invention is the ability to pivot turn a boat or plane when propellers are used as the propulsion elements. Therefore, while the following explanation refers to FIGS. 4 and 5, it assumes that (a) drive units 132, 136 of boat 100 operate a pair of similar propellers 134, and (b) drive units 232, 236 of plane 200 operate a pair of similar propellers 234.

Referring again to FIG. 4, in the event boat 100 is in operation but not under way and no driving torque is being delivered to steer-drive 114 by transmission 112, the turning of steering actuator 126 will result in the generation of equal and opposite steering torque by the port and starboard drive units 132, 136 and, thereby, will result in the opposite rotation of the propellers 134 associated with each drive unit, causing boat 100 to pivot turn in the water in the direction of the rotation of steering actuator 126. Such a pivot turn can be achieved without the use of a conventional rudder.

Similarly, in the event airplane 200 (FIG. 5) is in operation but not airborne and no driving torque is being delivered to steer-drive 214 by engine 210, the turning of steering actuator 226 will result in the generation of equal and opposite steering torque by port and starboard drive units 232, 236, and, thereby, will result in the opposite rotation of the propellers 234 associated with each drive unit, nullifying the airfoil effect of the propeller that is being driven in a reverse direction and causing plane 200 to pivot turn in place in the direction of the rotation of steering actuator 226. Such a pivot turn can be achieved without the use of a conventional rudder or the braking of landing gear, and it greatly facilitates the maneuverability of plane 200 when on the ground.

The just-described additional maneuverability of plane 200 is particularly valuable when plane 200 is a seaplane that is attempting docking maneuvers, because such planes are extremely difficult to maneuver at slow speeds on the water, especially under windy conditions.

As indicated above, the new steer-drive disclosed herein is lighter, smaller, more compact, easier to assemble, and less expensive to manufacture; and it provides greater ranges for speed-reduction ratio designs. Further, these many advantages of the invention will greatly enhance the operation of track-laying automotive vehicles and also create completely new opportunities for boat and airplane propulsion.

We claim:

1. A steer-drive of a vehicle operating primarily in fluids, said vehicle being one of (i) a boat and (ii) an airplane and having (a) respective left- and right-side propulsion elements, (b) respective left- and right-side drive units, (c) a main drive for delivering driving torque to said drive units, and (d) a steering actuator for indicating the desired direction for vehicle movement, said steer-drive comprising:

a central propulsion shaft for receiving driving torque from said main drive;

respective left and right orbital units, each orbital unit having:

an input gear mounted for rotation about a first axis for receiving driving torque from said central drive shaft, an output gear mounted for rotation about said first axis, a housing mounted for rotation about said first axis, and at least one cluster gear meshed with only said input and output gears and mounted for rotation on an orbit shaft positioned parallel with said first axis and carried by said housing so that, when said housing is rotated about said first axis, said cluster gear orbits about said input and output gears; and rotary connectors for transferring torque between rotating elements, a respective one of said rotary connectors being fixed to the housing of each one of said orbital units;

a steering motor responsive to the positioning of said steering actuator for generating steering torque that is delivered simultaneously through said rotary connectors to cause equal and opposite rotation of the housings of said orbital units, thereby combining said steering torque with any driving torque being delivered to said output gears by rotation of said input gears; and said respective left- and right-side propulsion elements are connected to said respective left- and right-side drive units so that said combined driving and steering torque being delivered to each said respective output gear of said orbital units is delivered to said respective left- and right-side propulsion elements.

2. The steer-drive according to claim 1 wherein when rotation of said input gears is prevented and said simultaneous steering torque is provided to cause equal and opposite rotation of said housings, only said steering torque is delivered to said output gears.

3. The steer-drive according to claim 1 wherein said first axes of both of said orbital units are in coaxial alignment, and said central propulsion shaft also rotates about the same axis.

4. The steer-drive according to claim 1 wherein:

each said set of rotary connectors comprises a mating helical worm and wormgear and said sets of helical worms and wormgears have, respectively, helix angles of opposite hand;

said steering motor drives a first one of said worms; and said other worm is connected to said first worm for rotation thereby in the same direction.

5. The steer-drive according to claim 4 wherein said worms are connected by a chain drive.

6. The steer-drive according to claim 1 wherein, when rotation of said housing is prevented, said gear tooth ratios between said cluster gear and said input and output gears are selected so that rotation of said input gear produces rotation of said output gear at a ratio less than 3:1.

7. The steer-drive according to claim 1 wherein said selected gear tooth ratios produce rotation of said output gear at a ratio of one of (a) less than 2:1 but greater than 1:1 and (b) less than 1:1.

8. The steer-drive according to claim 1 wherein:

when said housing is prevented from rotation, said output gear rotates in response to the rotation of said input gear at a speed ratio of x:1 (where x is less than 2 but greater than 0); and said central propulsion shaft receives said driving torque from said main drive at a speed ratio of 1:x.

9. The steer-drive according to claim 1 wherein said vehicle is a boat and said respective left- and right-side propulsion elements each comprises one of (a) a propeller and (b) a fluid jet emission device.

10. The steer-drive according to claim 1 wherein said vehicle is an airplane and said respective left- and right-side propulsion elements are respective left- and right-side propellers.

* * * * *